(12) United States Patent
Börzsönyi et al.

(10) Patent No.: US 8,957,178 B2
(45) Date of Patent: Feb. 17, 2015

(54) METHOD FOR PREPARING CONDENSATION RESINS AND USE THEREOF

(75) Inventors: Gabor Börzsönyi, Ludwigshafen (DE); Günter Scherr, Ludwigshafen (DE); Klaus Menzel, Ludwigshafen (DE); Stefan Meuer, Worms (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/588,299

(22) Filed: Aug. 17, 2012

(65) Prior Publication Data

US 2013/0102716 A1 Apr. 25, 2013

Related U.S. Application Data

(60) Provisional application No. 61/525,216, filed on Aug. 19, 2011, provisional application No. 61/655,512, filed on Jun. 5, 2012.

(51) Int. Cl.

| | |
|---|---|
| *C08G 4/00* | (2006.01) |
| *C08G 16/02* | (2006.01) |
| *C09D 17/00* | (2006.01) |
| *C08G 12/12* | (2006.01) |
| *C08G 12/40* | (2006.01) |
| *C08G 12/42* | (2006.01) |
| *C09D 161/32* | (2006.01) |

(52) U.S. Cl.
CPC ............ *C08G 16/0231* (2013.01); *C09D 17/00* (2013.01); *C08G 12/12* (2013.01); *C08G 12/40* (2013.01); *C08G 12/422* (2013.01); *C09D 161/32* (2013.01); *C09D 17/002* (2013.01)
USPC ............................ 528/243; 528/232; 524/230

(58) Field of Classification Search
None
See application file for complete search history.

(56) References Cited

U.S. PATENT DOCUMENTS

| | | | | |
|---|---|---|---|---|
| 2,327,984 | A | * | 8/1943 | West .............................. 528/232 |
| 4,102,840 | A | * | 7/1978 | Pusch ............................ 524/843 |
| 4,621,133 | A | * | 11/1986 | Petersen et al. ................ 528/252 |
| 2012/0116047 | A1 | | 5/2012 | Meuer et al. |

FOREIGN PATENT DOCUMENTS

| | | |
|---|---|---|
| CN | 101372606 A | 2/2009 |
| DE | 1 670 283 | 1/1971 |
| EP | 0 167 960 A2 | 1/1986 |
| WO | WO 97/08255 | 3/1997 |
| WO | WO 2011/009765 A1 | 1/2011 |
| WO | WO 2012/110436 A1 | 8/2012 |

OTHER PUBLICATIONS

Zhang Yi-fu, Zeng Xing-rong, J. Cent. South Univ. Technol. (2009) 16: 0080-0084.*
Datasheet for Butyl Carbitol, Dow Company, Mar. 2004, Form No. 110-00624-0304.*
International Search Report and Written Opinion issued Jan. 17, 2013 in PCT/IB2012/053878 filed Jul. 30, 2012.
U.S. Appl. No. 13/984,403, filed Aug. 8, 2013, Meuer, et al.

* cited by examiner

*Primary Examiner* — Susannah Chung
*Assistant Examiner* — Robert T Butcher
(74) *Attorney, Agent, or Firm* — Oblon, Spivak, McClelland, Maier & Neustadt, L.L.P.

(57) ABSTRACT

The present invention relates to new condensation resins of urea, formaldehyde, and CH-acidic aldehydes, to methods for preparing them, and to their use.

15 Claims, No Drawings

METHOD FOR PREPARING CONDENSATION RESINS AND USE THEREOF

The present invention relates to new condensation resins of urea, formaldehyde, and CH-acidic aldehydes, to methods for preparing them, and to their use.

Condensation products of urea and/or derivatives thereof with formaldehyde and CH-acidic aldehydes are already known from the patent literature. Condensation resins of this kind are frequently used to provide pigment preparations.

For the provision of such pigment preparations, these condensation resins require mixing of organic solvents in order to adjust the viscosity. Because of statutory regulations, however, there is a demand for low-viscosity condensation resins in order thereby to reduce the demand for organic solvents as well and hence to lower the level of volatile organic compounds (VOC).

DE-A 1670283 discloses a process for preparing hexahydropyrimidine derivatives by reacting ureas with isobutyraldehyde and formaldehyde in an acidic medium in the presence of longchain alcohols.

At the end of this reaction, neutralization takes place and the volatile constituents are removed by distillation.

EP 167960 A2 discloses a process in which urea is reacted with isobutyraldehyde, for example, in the presence of an acid and optionally in the presence of one or more alcohols and the product is subsequently condensed with formaldehyde in the presence of at least one alcohol.

At the end of this reaction, the volatile constituents are removed by distillation.

Common to these reaction regimes is that the condensation resins are synthesized by reacting alcohols in the presence of at least one component from isobutyraldehyde, urea, and formaldehyde.

A disadvantage is that preparations comprising condensation resins obtained in this way still have a relatively high viscosity.

It was an object of the present invention to develop condensation products of urea, formaldehyde, and CH-acidic aldehydes that make it possible to obtain preparations having a low viscosity.

This object has been achieved by means of methods for reducing the viscosity of a condensation resin by reacting a substantially fully reacted condensation resin synthesized from at least one, preferably precisely one, urea, formaldehyde, and at least one, preferably precisely one, CH-acidic aldehyde with at least one monofunctional alcohol in the presence of at least one Brönsted acid.

By "substantially fully reacted" here is meant that the synthesis components of the condensation resins—urea, formaldehyde, and CH-acidic aldehyde—have undergone reaction with one another to an extent of at least 95%, preferably at least 98%, more preferably at least 99%, and very preferably at least 99.5%.

The amount of free formaldehyde in the substantially fully reacted condensation resin ought to be below 5% by weight, preferably below 3%, more preferably below 2%, very preferably below 1%, and more particularly below 0.5% by weight.

The amount of unreacted urea in the substantially fully reacted condensation resin ought to be below 2% by weight, preferably below 1%, more preferably below 0.5%, and very preferably below 0.1% by weight.

The amount of unreacted CH-acidic aldehyde in the substantially fully reacted condensation resin ought to be below 3% by weight, preferably below 2%, more preferably below 1%, and very preferably below 0.5% by weight.

The stated conversion and the low amount of the synthesis components are preferably achieved by stopping the reaction in the preparation of the substantially fully reacted condensation resin, by neutralizing a catalyst present in the reaction, and subsequently removing the volatile constituents at least partly, preferably substantially, by distillation.

The present invention further provides a method for preparing condensation resins from at least one, preferably precisely one, urea, formaldehyde, and at least one, preferably precisely one, CH-acidic aldehyde, by reaction of ureas of the general formula (I) and/or (II)

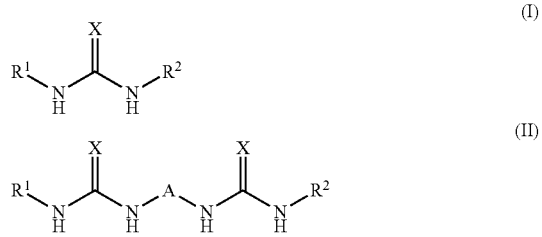

in which $R^1$ and $R^2$ independently of one another are hydrogen or identical or different $C_1$-$C_{20}$ alkyl radicals, A is a $C_1$-$C_{20}$ alkylene radical, and X is oxygen or sulfur, with formaldehyde and a CH-acidic aldehyde of the general formula (III)

in which the radicals $R^3$ and $R^4$ independently of one another are identical or different alkyl, cycloalkyl, aryl or alkylaryl radicals or $R^3$ and $R^4$ together may form a ring, in the temperature range between 60 and 150° C. in the presence of acids or bases, optionally in the presence of solvent and/or diluent, which involves, after the end of the reaction, neutralizing the acids or bases, distillatively removing volatile constituents, and carrying out reactions subsequently with at least one alcohol in the presence of at least one acid.

One advantage of the method of the invention is that the condensation products obtained by the method of the invention have a lower viscosity than products which have not been reacted with alcohol.

This permits an increased solids content in pigment preparations, which reduces the need to use solvents, enabling organic emissions (VOC) to be lower.

The condensation resins obtainable in accordance with the invention generally have a number-average molar weight $M_n$ of 300 to less than 1000 g/mol, preferably of 400 to 950 g/mol, and more preferably of 500 to 900 g/mol, a weight-average molar weight $M_w$ of 500 to 2000, and a polydispersity of 1.2 to 3.0, preferably 1.3 to 2.5.

The values for the number-average and weight-average molecular weights, $M_n$ and $M_w$, were determined by means of gel permeation chromatography measurements on PL-GEL (3-column combination; 1×Mini-Mix C and 2×Mini-Mix E). The eluent used was THF. For calibration, polystyrene/hexylbenzene reference materials with polydispersities of <1.1 were used. The values reported, where the polymers are not polymers of styrene, can therefore be regarded as polystyrene equivalents. Reference materials used: polystyrene from 3 000 000 to 580 g/mol and hexylbenzene 162 g/mol. The method is described in Analytiker Taschenbuch, vol. 4, pages 433 to 442, Berlin 1984.

The condensation resins of the invention generally have an acid number in accordance with DIN EN 2114 of less than 10 mg KOH/g, preferably of less than 8, more preferably of less than 5, very preferably of less than 3, more particularly of less than 2, and in special cases less than 1 mg KOH/g.

The condensation resins of the invention generally have a hydroxyl number in accordance with DIN ISO 4629 of 5 to 60 mg KOH/g, preferably of 10 to 50, more preferably of 15 to 45, and very preferably of 20 to 40 mg KOH/g.

The condensation resins of the invention generally have a saponification number in accordance with DIN 53401 of less than 100 mg KOH/g, preferably of 5 to 90, more preferably of 10 to 70, and very preferably of 20 to 50 mg KOH/g.

The condensation resins of the invention generally have a residual monomer content of aldehyde (III), more particularly of isobutyraldehyde, of less than 500 ppm by weight, preferably of less than 400 ppm by weight, and more preferably of less than 300 ppm by weight.

The condensation resins of the invention generally have a residual monomer content of formaldehyde of less than 500 ppm by weight, preferably of less than 400 ppm by weight, more preferably of less than 300 ppm by weight, very preferably of less than 200, and more particularly of less than 100 ppm by weight.

The condensation resins of the invention generally have a glass transition temperature $T_g$ by the DSC method (differential scanning calorimetry) in accordance with ASTM 3418/82, with a heating rate of 2.5° C./min, of less than 50° C., preferably of less than 40° C., more preferably of less than 30° C., very preferably of less than 20° C., and more particularly of less than 10° C.

Individual details of the synthesis components of the resins of the invention now follow.

Suitable ureas are those of the general formula (I) or (II)

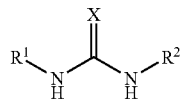

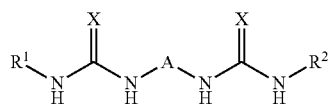

in which $R^1$ and $R^2$ independently of one another are hydrogen or identical or different $C_1$-$C_{20}$, preferably $C_1$ to $C_4$ alkyl radicals, A is a $C_1$-$C_{20}$, preferably $C_1$ to $C_4$, more preferably $C_1$ to $C_3$, and very preferably $C_1$ to $C_2$ alkylene radical, and X is oxygen or sulfur, preferably oxygen;

besides urea or thiourea it is also possible for monosubstituted and disubstituted ureas and also alkylenediureas to be used.

Urea ($H_2N$—(CO)—$NH_2$) serves preferably for preparing the resins of the invention.

The formaldehyde can be used as an aqueous solution, for example a 30% to 55%, preferably 35% to 49%, more preferably 40% to 49% strength solution, as paraformaldehyde or in the form of trioxane, tetraoxane or formaldehyde acetals, preferably in aqueous solution.

Since the condensation proceeds via hydroxymethylureas, it is also possible to use the corresponding hydroxylmethylureas in place of the ureas and the formaldehyde.

These hydroxymethylureas can be generated preferably by preliminary condensation of the formaldehyde with urea in situ, the resultant reaction mixture from the preliminary condensation being used preferably in the method of the invention.

For a preliminary condensation of this kind, urea and formaldehyde are reacted in a molar ratio of 1:1 to 1:15, preferably 1:3 to 1:10, more preferably 1:7 to 1:9 at temperatures from 20° C. to 120° C., preferably 50-120° C., for a duration of 10 minutes to 6 hours. This reaction takes place preferably at pH levels of up to 6, but is also possible in the alkaline range. The resultant water of reaction can be left in the reaction mixture, or else may be removed together with the water introduced as a result of the use of water-containing formaldehyde, this removal taking place, for example, by distillation or stripping, preferably by azeotropic distillation with an entraining agent.

The preliminarily condensed reaction mixture thus obtained is then used, in one preferred embodiment, in the method of the invention, and the formaldehyde and urea employed in the preliminary condensation are taken into account in the context of the reaction stoichiometry.

CH-acidic aldehydes may be those of the general formula (III)

in which the radicals $R^3$ or $R^4$ independently of one another are identical or different $C_1$-$C_{20}$, preferably $C_1$ to $C_4$ alkyl, $C_3$-$C_{20}$, preferably $C_5$ to $C_{12}$ cycloalkyl, $C_6$-$C_{20}$, preferably $C_6$ to $C_{12}$ aryl, or alkylaryl radicals, or $R^3$ and $R^4$ may together form a ring. CH-acidic aldehydes for the purposes of the invention are those which have precisely one hydrogen atom on the carbon atom $C_\alpha$ adjacent to the carbonyl group.

Examples of $C_1$-$C_{20}$ alkyl radicals are methyl, ethyl, propyl, isopropyl, n-butyl, sec-butyl, tert-butyl, pentyl, hexyl, heptyl, octyl, 2-etylhexyl, 2,4,4-trimethylpentyl, decyl, dodecyl, tetradecyl, hetadecyl, octadecyl, 1,1-dimethylpropyl, 1,1-dimethylbutyl, and 1,1,3,3-tetramethylbutyl.

Examples of $C_3$-$C_{20}$ cycloalkyl radicals are cyclopropyl, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, and norbornyl.

Examples of $C_6$-$C_{20}$ aryl or alkylaryl radicals are phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, benzyl, 1-phenylethyl, 2-phenylethyl, α,α-dimethylbenzyl, benzhydryl, p-tolylmethyl, and 1-(p-butylphenyl)ethyl.

$C_1$-$C_4$ alkyl in the context of this specification means methyl, ethyl, isopropyl, n-propyl, n-butyl, isobutyl, sec-butyl, and tert-butyl, preferably methyl, ethyl, n-propyl, and n-butyl, more preferably methyl and ethyl, and very preferably methyl.

Examples of radicals $R^1$ and $R^2$ are, independently of one another, hydrogen and $C_1$ to $C_4$ alkyl, preferably hydrogen and methyl, and more preferably hydrogen.

Alkylene radicals A possible are, for example, methylene, 1,2-ethylene, 1,2-propylene, 1,3-propylene, 1,4-butylene, 1,6-hexylene, 2-methyl-1,3-propylene, 2-ethyl-1,3-propylene, 2,2-dimethyl-1,3-propylene, and 2,2-dimethyl-1,4-butylene.

Preferred radicals A are methylene, 1,2-ethylene, 1,2-propylene, and 1,3-propylene, more preferably methylene and 1,2-ethylene, and very preferably methylene.

The radicals $R^3$ and $R^4$ independently of one another are preferably alkyl or cycloalkyl, more preferably $C_1$ to $C_4$ alkyl, very preferably methyl, ethyl, n-propyl, and n-butyl, more particularly methyl, ethyl, and n-butyl, and especially methyl.

Where the radicals $R^3$ and $R^4$ form a ring together with the carbon atom $C_\alpha$ adjacent to the carbonyl group, the ring in question is preferably a five- to twelve-membered ring, as for example cyclopentyl, cyclohexyl, cyclooctyl or cyclododecyl, preferably cyclopentyl, cyclohexyl or cyclododecyl, and more preferably cyclopentyl or cyclohexyl.

Examples of CH-acidic aldehydes are preferably CH-acidic aldehydes containing exclusively alkyl and/or cycloalkyl groups, more preferably isobutyraldehyde, 2-ethylhexanal, 2-methylpentanal, and isovaleraldehyde, very preferably isobutyraldehyde, 2-ethylhexanal, and 2-methylpentanal, and more particularly isobutyraldehyde.

For the method of the invention, urea, formaldehyde, and CH-acidic aldehyde are reacted in general in a molar ratio of 1:2 to 15:2 to 15, preferably of 1:3 to 12:3 to 12, more preferably of 1:3.8 to 9:3.8 to 9.

Suitable acids include organic and inorganic acids, preferably acids having a $pK_a$ of up to 3.

Examples thereof are sulfuric acid, phosphoric acid, nitric acid, hydrochloric acid, phosphorous acid ($H_3PO_3$), diphosphoric acid ($H_4P_2O_7$), sulfonic acids, more preferably methanesulfonic acid, trifluoromethanesulfonic acid, para-toluenesulfonic acid, benzenesulfonic acid, dodecylbenzenesulfonic acid, cyclododecanesulfonic acid, camphorsulfonic acid or acidic ion exchangers with sulfonic acid groups, and also formic acid.

It is also possible, albeit less preferred, to catalyze the condensation basically. For this purpose it is possible to use basic alkali metal compounds, alkaline earth metal compounds or quaternary ammonium compounds, preferably alkali metal compounds, more preferably sodium or potassium, very preferably sodium, examples being oxides, hydroxides ($OH^-$), carbonates ($CO_3^{2-}$), amides ($NH_2^-$) or $C_1$ to $C_{20}$ alkoxides, preferably hydroxides or $C_1$ to $C_4$ alkoxides, more preferably hydroxides, methoxides, ethoxides or tert-butoxides, very preferably hydroxides or methoxides.

The catalyst is used in general in amounts of 0.5 to 30 mol %, based on the CH-acidic aldehyde, preferably in amounts of 2 to 20, more preferably 3 to 10 mol %.

In particular if basic compounds are used, then phase transfer catalysts as well can be used additionally.

Preferred phase transfer catalysts are tetrasubstituted ammonium salts, more preferably of the formula

in which
$R^5$ to $R^8$ each independently of one another are $C_1$ to $C_{20}$ alkyl or $C_6$ to $C_{20}$ alkylaryl radicals and
$X^-$ is an anion of an acid.

The radicals $R^5$ to $R^8$ preferably have a total of at least 8, preferably at least 12, more preferably at least 15 carbon atoms.

Examples of anions $X^-$ are chloride, bromide, iodide, sulfate, methyl sulfate, ethyl sulfate, methyl carbonate, trifluoromethanesulfonate, $C_1$-$C_{20}$ alkylsulfonate or $C_6$-$C_{20}$ alkylarylsulfonate.

The condensation is carried out generally in the temperature range between 60 and 150° C., preferably 80 and 100° C.

When carrying out the method of the invention it is possible to use solvents and/or diluents, and possibly also entraining agents as well, for the azeotropic removal of water. Suitable solvents for the azeotropic removal of water include, in particular, aliphatic, cycloaliphatic, and aromatic hydrocarbons or mixtures thereof. Employed with preference are n-pentane, n-hexane, n-heptane, cyclohexane, methylcyclohexane, benzene, toluene or xylene. Particularly preferred are cyclohexane, methylcyclohexane, xylene, and toluene.

Aromatic hydrocarbons in particular have proven themselves as solvents. Among these, xylene is deserving of particular emphasis.

The conversion rate may be determined, for example, from the amount of water discharged, or alternatively by monitoring of the viscosity of the reaction mixture. Preference is given to the conversion rate relative to the aldehyde functions that have already reacted. The free aldehyde functions are preferably determined by the method of De Jong (DIN EN ISO 9020), and the unreacted CH-acidic aldehyde is determined by gas chromatography. The conversion rate thus determined ought in general to be at least 30%, preferably at least 40%, more preferably at least 50%, very preferably at least 60%, and more particularly at least 70%.

The reaction of the substantially fully reacted condensation resin with at least one alcohol (V), of the invention, may take place at any desired point in time after the condensation resin has been prepared, as for example directly after the distillative removal of the volatile constituents or else after prolonged storage of the condensation resin.

The reaction of the invention is carried out with at least one, as for example one to three, preferably one to two, and more preferably precisely one alcohol (V), preferably an alkanol, more preferably a $C_1$ to $C_{20}$ alkanol; very preferably a $C_1$ to $C_{10}$ alkanol, and especially a $C_1$ to $C_8$ alkanol.

Examples of alcohols, in addition to the alkanols recited below, are, for example, alkylene glycol monoalkyl ethers and polyalkylene glycol monoalkyl ethers having a molar weight of up to 300 g/mol, preferably polyethylene glycol monoalkyl ethers and polypropylene glycol monoalkyl ethers of the formula HO—$[-X_i-]_n$—$R^9$, in which
n is a positive integer from 1 to 5, preferably from 1 to 4, more preferably from 1 to 3, very preferably 1 or 2, and
$R^9$ is a $C_1$-$C_{20}$, preferably a $C_1$ to $C_4$ alkyl radical, and
each $X_i$ for i=1 to n may be selected independently of one another from the group

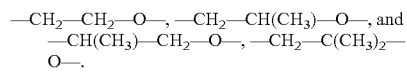

Preference is given to ethylene glycol monomethyl ether, ethylene glycol monoethyl ether, ethylene glycol monobutyl ether, and 1,3-propanediol monomethyl ether.

Examples of alkanols are methanol, ethanol, isopropanol, n-propanol, n-butanol, isobutanol, sec-butanol, tert-butanol, n-pentanol, n-hexanol, n-heptanol, n-octanol, 2-ethylhexanol, 3-propylhexanol, n-decanol, n-dodecanol (lauryl alcohol), stearyl alcohol, cetyl alcohol, and lauryl alcohol.

Preferred compounds (V) are methanol, ethanol, isopropanol, n-propanol, n-butanol, and 2-ethylhexanol, more preferably methanol, ethanol and n-butanol, very preferably methanol and n-butanol, and more particularly n-butanol.

In one exemplary embodiment, the condensation resin to be reacted can be dissolved in a sufficient amount of the alcohol (V) and then reacted.

In a further, preferred embodiment, the condensation resin to be reacted is dissolved in a suitable solvent and reacted with, for example, 10% to 100%, preferably 20% to 80%, and very preferably 30% to 60% by weight of alcohol (V), based on the condensation resin.

Conceivable solvents are the above-designated hydrocarbons, ketones, ethers, and esters. Preferred are n-pentane, n-hexane, n-heptane, cyclohexane, methylcyclohexane, benzene, toluene, xylene, acetone, methyl ethyl ketone, ethyl acetate, butyl acetate, methylglycol acetate, ethylglycol acetate, methoxypropyl acetate, butylglycol, tetrahydrofuran, dioxane, and ethylglycol ether.

For the catalysis of the reaction of the invention, the reaction mixture is admixed with up to 1% by weight, based on the condensation resin, of at least one, preferably precisely one, Brönsted acid, preferably 0.05% to 0.5%, more preferably 0.08% to 0.3%, and more preferably 0.1% to 0.2% by weight of Brönsted acid. The pH of the reaction mixture ought preferably to be 2 to 5, preferably 3 to 4.

Suitable Brönsted acids are organic and inorganic acids, preferably acids having a $pK_a$ of up to 3. Examples thereof are sulfuric acid, phosphoric acid, nitric acid, hydrochloric acid, phosphorous acid ($H_3PO_3$), diphosphoric acid ($H_4P_2O_7$), sulfonic acids, examples being methanesulfonic acid, trifluoromethanesulfonic acid, para-toluenesulfonic acid, benzenesulfonic acid, dodecylbenzenesulfonic acid, cyclododecanesulfonic acid, camphorsulfonic acid or acidic ion exchangers with sulfonic acid groups, and also formic acid. Preference is given to sulfuric acid, phosphoric acid, nitric acid, and hydrochloric acid, particular preference to sulfuric acid.

Condensation resin and alcohol (V) are reacted with one another for 1 to 10 hours, preferably 2 to 8 hours, and more preferably 5 to 7 hours at a temperature of 40 to 100° C., preferably 50 to 80° C.

When the desired molecular weight or conversion has been reached, the condensation is stopped.

The reaction is stopped by neutralization with a base, such as sodium or potassium alkoxide, for example, and preferably NaOH or KOH, and the excess alcohol (V) present in the reaction mixture, and also any lower oligomers or unreacted monomers that can be separated off by distillation, are removed by distillation or stripping.

The alcohol (V) is generally separated off to a residual level of not more than 5% by weight, preferably not more than 4% by weight, more preferably not more than 3% by weight, very preferably not more than 2% by weight, and more particularly not more than 1% by weight.

If solvent was present during the reaction, it is likewise separated off, preferably by distillation, to a residual level of not more than 5% by weight, preferably not more than 4% by weight, more preferably not more than 3% by weight, very preferably not more than 2% by weight, and more particularly not more than 1% by weight.

The reaction of the invention is possible batchwise and continuously.

The condensation resins prepared by the method of the invention are suitable especially for producing pigment preparations.

For this purpose, at least one pigment P and at least one condensation resin K of the invention, and also, optionally, at least one diluent V and also optionally at least one additive AD, are mixed with one another.

Such mixing may take place, for example, in a stirring vessel, mixer, or extruder, or preferably in a disperser, or kneading apparatus.

Pigments, according to CD Römpp Chemie Lexikon—Version 1.0, Stuttgart/New York: Georg Thieme Verlag 1995, with reference to DIN 55943, are particulate "colorants that are organic or inorganic, chromatic or achromatic, and are virtually insoluble in the application medium".

Virtually insoluble here means a solubility at 25° C. of below 1 g/1000 g of application medium, preferably below 0.5, more preferably below 0.25, very preferably below 0.1, and more particularly below 0.05 g/1000 g of application medium.

Examples of pigment P encompass any desired systems of absorption pigments and/or effect pigments, preferably absorption pigments. There are no restrictions whatsoever on the number and selection of the pigment components. They may be adapted as desired to the particular requirements, such as the desired perceived color, for example.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments, for example; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The color-imparting absorption pigments are, for example, customary organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments and carbon black.

Titanium dioxide, additionally, may be cited as a pigment.

Examples of pigments P are listed in WO 97/08255, page 8 line 11 to page 11 line 16, hereby part of the disclosure content of this specification.

Examples of diluents V are aromatic and/or (cyclo)aliphatic hydrocarbons and mixtures thereof, halogenated hydrocarbons, esters, and ethers.

Preference is given to aromatic hydrocarbons, (cyclo)aliphatic hydrocarbons, alkyl esters of alkanoic acids, alkoxylated alkyl esters of alkanoic acids, and mixtures thereof.

Particularly preferred are mono- or polyalkylated benzenes and naphthalenes, alkyl esters of alkanoic acids and alkoxylated alkyl esters of alkanoic acids, and mixtures thereof.

Especially preferred are xylene and 1-methoxy-2-propyl acetate.

Preferred aromatic hydrocarbon mixtures are those which comprise predominantly aromatic $C_7$ to $C_{14}$ hydrocarbons and may span a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising them.

Examples thereof are the Solvesso® products from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell. Hydrocarbon mixtures comprising paraffins, cycloparaffins, and aromatics are also available commercially under the names Kristalloel (for example Kristalloel 30, boiling range about 158-198° C., or Kristalloel 60: CAS No. 64742-82-1), white spirit (for example, likewise CAS No. 64742-82-1) or solvent naphtha (light: boiling range about 155-180° C., heavy: boiling range about 225-300° C.). The aromatics content of hydrocarbon mixtures of these kinds is generally more than 90% by weight, preferably more than 95%, more preferably more than 98%, and very preferably more than 99% by weight. It may be useful to use hydrocarbon mixtures having a particularly reduced naphthalene content.

Halogenated hydrocarbons are, for example, chlorobenzene and dichlorobenzene or the isomer mixtures thereof.

Esters are, for example, n-butyl acetate, ethyl acetate, 1-methoxy-2-propyl acetate, and 2-methoxyethyl acetate.

Ethers are, for example, THF, dioxane, and the mono- and dimethyl, -ethyl or -n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin, and isomer mixtures of linear or branched alkanes and/or cycloalkanes.

Additionally preferred are n-butyl acetate, ethyl acetate, 1-methoxy-2-propyl acetate, 2-methoxyethyl acetate, and also mixtures thereof, more particularly with the aromatic hydrocarbon mixtures recited above.

For adjustment of the viscosity, the condensation resins prepared in accordance with the invention are formulated preferably as a 70% to 90% strength solution in xylene or 1-methoxy-2-propyl acetate.

Additives AD are, for example, dispersants, leveling assistants, plasticizers, and rheological auxiliaries. Substances of these kinds are known to the skilled person.

The present invention hence also provides pigment preparations comprising
 at least one pigment P,
 optionally at least one diluent V,
 at least one condensation resin K of the invention, and
 optionally at least one additive AD.
 Typical compositions of such pigment preparations are
 10%-80% by weight P
 0%-40% by weight V,
 10%-70% by weight K, and
 0%-15% by weight AD,
with the proviso that the sum is always 100% by weight.

It is an advantage of the condensation resins of the invention that their use in the pigment preparations of the invention allows a greater amount of pigment P to be introduced (level of pigmentation) and/or allows the amount of diluent V required to be reduced, in each case as compared with analogous condensation resins having a softening point of 80° C. or more.

Furthermore, the color strength of the pigment preparations is increased through use of the condensation resins of the invention.

Moreover, the condensation resins of the invention can be used in combination with other, physically drying film formers typically intended for use as film-forming binders, such as cellulose derivatives, examples being nitrocellulose, ethylcellulose, cellulose acetate, cellulose acetobutyrate, chlorinated rubber, copolymers based on vinyl ester, vinyl ether, vinyl chloride, acrylic ester and/or vinylaromatics, examples being vinyl chloride/vinyl isobutyl ether copolymers, or chemically drying binders, such as alkyd resins, drying and semidrying oils, for producing coating materials, the amount of condensation resin of the invention in these coating materials being variable within wide limits, but amounting in the majority of cases to not more than 50% by weight of the total binder.

The film-forming binders of the invention are suitable, with application by customary techniques, such as spreading, spraying, casting, for the coating of substrates, such as wood, chipboard, paper, and metal, examples being iron sheets.

The condensation resins obtained by the methods of the invention are stable on storage and have a lower viscosity than comparable condensation resins stabilized with sodium methoxide, thus resulting in less of a need to use volatile organic compounds and allowing the setting of a higher level of nonvolatile constituents in the formulations.

They can be processed very advantageously. Coatings are obtained that have very good mechanical properties, good gloss, good light stability, and good water resistance. The film-forming binders of the invention can be used very advantageously, for example, in sprayapplied matt finishes, quick-sanding primers, paper coatings, and anticorrosion coatings.

The parts and percentages indicated in the examples denote parts by weight and percentages by weight, respectively.

EXAMPLES

Example 1

340.2 g (420 ml, 4.59 mol) of n-butanol were introduced and 226.8 g of powdered Laropal® A81 (commercially available condensation resin based on isobutyraldehyde, formaldehyde, and urea from BASF SE, Ludwigshafen) were introduced in portions over the course of an hour at a temperature of 30° C. rising to 50° C. until the resin had dissolved and a clear solution was obtained. This solution was admixed at a temperature of 50° C. with 9 drops of 50% strength by weight sulfuric acid (pH of the reaction mixture below 3.8 when measured with pH paper), and the reaction mixture was stirred at 50° C. for 6 hours, during which a clear distillate was taken off at a pressure of initially 600 mbar and climbing to about 500 mbar. The reaction mixture was then neutralized with 40 drops of 25% strength by weight aqueous sodium hydroxide solution, and the hot reaction mixture was discharged from the reaction vessel.

This gave 300.5 g of a clear, viscous liquid having a solids content of 76.3% by weight and a viscosity of 1330 mPas, and 76.9 g of a clear liquid distillate. The condensation resin employed had, by GPC, a number-average molecular weight $M_n$ of about 1500 and a weight-average molecular weight $M_w$ of about 4900 g/mol, whereas the condensation resin obtained had a number-average molecular weight $M_n$ of about 500 and a weight-average molecular weight $M_w$ of about 780 g/mol.

Application examples relating to reduction in the VOC content

For preparing the pigment formulations, the components were dispersed with one another in the weight figures in the table, and determinations were made of the amount of organic components (VOC), in g/l, and also of the viscosity.

The formulations compared with one another were adjusted to a comparable viscosity with the stated amount of solvent.

Example A

Inorganic Yellow Pigment with Resin from Example 1

| | |
|---|---|
| Resin from example 1 | 34 parts |
| 1-Methoxy-2-propyl acetate (MPA) | 4.5 parts |
| EFKA 4330 | 6.5 parts |
| Bayferrox 3920 | 55 parts |
| VOC calculated | 252 |
| Viscosity [mPas] | 1980 |

Example B

Organic Blue Pigment with Resin from Example 1

| | |
|---|---|
| Resin from example 1 | 64 parts |
| 1-Methoxy-2-propyl acetate (MPA) | 6 parts |
| EFKA 4330 | 10 parts |
| Heliogenblau L 7101 F | 20.0 parts |
| VOC calculated | 248 |
| Viscosity [mPas] | 1726 |

Comparative Example C

Inorganic1 Yellow Pigment with Laropal® A81 (Comparison to Example A)

| | |
|---|---|
| Laropal ® A81 | 30 parts |
| 1-Methoxy-2-propyl acetate (MPA) | 8.5 parts |
| EFKA 4330 | 6.5 parts |
| Bayferrox 3920 | 55 parts |
| VOC calculated | 402 |
| Viscosity [mPas] | 1900 |

Comparative example D

Organic Blue Pigment with Laropal® A81 (Comparison to Example B)

| | |
|---|---|
| Laropal ® A81 | 56.7 parts |
| 1-Methoxy-2-propyl acetate (MPA) | 13.3 parts |
| EFKA 4330 | 10 parts |
| Heliogen Blue L 7101 F | 20.0 parts |
| VOC calculated | 420 |
| Viscosity [mPas] | 1480 |

Materials used:
MPA: 1-Methoxy-2-propyl acetate (organic solvent used as diluent)
EFKA 4330: Wetting and dispersing additive
Bayferrox® 3920: Yellow iron oxide from Lanxess as inorganic pigment
Heliogenblau® L 7101F: Phthalocyanine blue as organic pigment It is seen that with the resin from the method of the invention it is necessary to use a significantly greater amount of solvent in order to achieve a comparable viscosity, resulting in an increased VOC level, and at the same time only a smaller amount of pigment can be incorporated, resulting in a product having a lower color strength.

The invention claimed is:

1. A method for reducing viscosity of a condensation resin, the method comprising:
reacting a substantially fully reacted, solidified condensation resin in need thereof with a monofunctional alcohol in the presence of BrØnsted acid,
wherein the substantially fully reacted condensation resin is synthesized from one molar part of at least one urea, from 3.8 to 9 molar parts formaldehyde, and from 3.8 to 9 molar parts of at least one CH-acidic aldehyde, and
wherein the at least one urea, formaldehyde, and the at least one CH-acidic aldehyde in the substantially fully reacted condensation resin have undergone reaction with one another to an extent of at least 95%.

2. A method for preparing a condensation resin and for reducing a viscosity thereof, the method comprising:
reacting one molar part of at least one urea, from 3.8 to 9 molar parts formaldehyde, and from 3.8 to 9 molar parts of at least one CH-acidic aldehyde, at a temperature between 60 and 150° C. in the presence of an acid, a base, or any combination thereof, and optionally further in the presence of a solvent, a diluent, or any combination thereof, thereby obtaining a condensation resin; then
neutralizing the acid, base, or combination thereof;
distillatively removing a volatile constituent; and
subsequently reacting the solidified condensation resin in need thereof with a monofunctional alcohol in the presence of an acid, thereby reducing a viscosity of the condensation resin,
wherein the at least one urea is a urea of formula (I), a urea of formula (II), or any combination thereof:

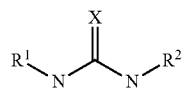
(I)

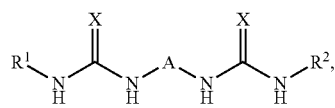
(II)

$R^1$ and $R^2$ are each independently hydrogen or a $C_1$-$C_{20}$ alkyl radical,
A is a $C_1$-$C_{20}$ alkylene radical,
X is oxygen or sulfur, the at least one CH-acidic aldehyde is of formula (III):

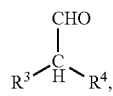
(III)

and
$R^3$ and $R^4$ are each independently an alkyl, cycloalkyl, aryl, or alkylaryl radical, or $R^3$ and $R^4$ together optionally form a ring.

3. The method according to claim 1, wherein the at least one CH-acidic aldehyde is at least one selected from the group consisting of isobutyraldehyde, 2-ethylhexanal, 2-methylpentanal, and isovaleraldehyde.

4. The method according to claim 1, wherein the alcohol is an alkylene glycol monoalkyl ether or polyalkylene glycol monoalkyl ether having a molar weight of up to 300 g/mol.

5. The method according to claim 1, wherein the alcohol is selected from the group consisting of methanol, ethanol, isopropanol, n-propanol, n-butanol, isobutanol, sec-butanol, tert-butanol, n-pentanol, n-hexanol, n-heptanol, n-octanol, 2-ethylhexanol, 3-propylheptanol, n-decanol, n-dodecanol (lauryl alcohol), stearyl alcohol, cetyl alcohol, and lauryl alcohol.

6. The method according to claim 1,
wherein a period of reacting the resin and the alcohol is from 1 to 10 hours, and
a temperature of reacting the resin and the alcohol is from 40 to 100° C.

7. A condensation resin obtained by the method of claim 1.

8. A pigment composition, comprising:
a pigment P,
optionally a diluent V,
the condensation resin of claim 7, and
optionally an additive AD.

9. The method according to claim 2, wherein the at least one CH-acidic aldehyde is at least one selected from the group consisting of isobutyraldehyde, 2-ethylhexanal, 2-methylpentanal, and isovaleraldehyde.

10. The method according to claim 2, wherein the alcohol is an alkylene glycol monoalkyl ether or polyalkylene glycol monoalkyl ether having a molar weight of up to 300 g/mol.

11. The method according to claim 2, wherein the alcohol is selected from the group consisting of methanol, ethanol, isopropanol, n-propanol, n-butanol, isobutanol, sec-butanol, tert-butanol, n-pentanol, n-hexanol, n-heptanol, n-octanol, 2-ethylhexanol, 3-propylheptanol, n-decanol, n-dodecanol (lauryl alcohol), stearyl alcohol, cetyl alcohol, and lauryl alcohol.

12. The method according to claim 2,
wherein a period of reacting the resin and the alcohol is from 1 to 10 hours, and
a temperature of reacting the resin and the alcohol is from 40 to 100° C.

13. A condensation resin obtained by the method of claim 2.

14. A pigment composition, comprising:
a pigment P,
optionally a diluent V,
the condensation resin of claim 7, and
optionally an additive AD.

15. A pigment composition, comprising:
a pigment P,
optionally a diluent V,
the condensation resin of claim 13, and
optionally an additive AD.

* * * * *